Sept. 3, 1963 H. V. SCHENCK, JR 3,102,852
NUCLEAR POWER PLANT
Filed May 7, 1957
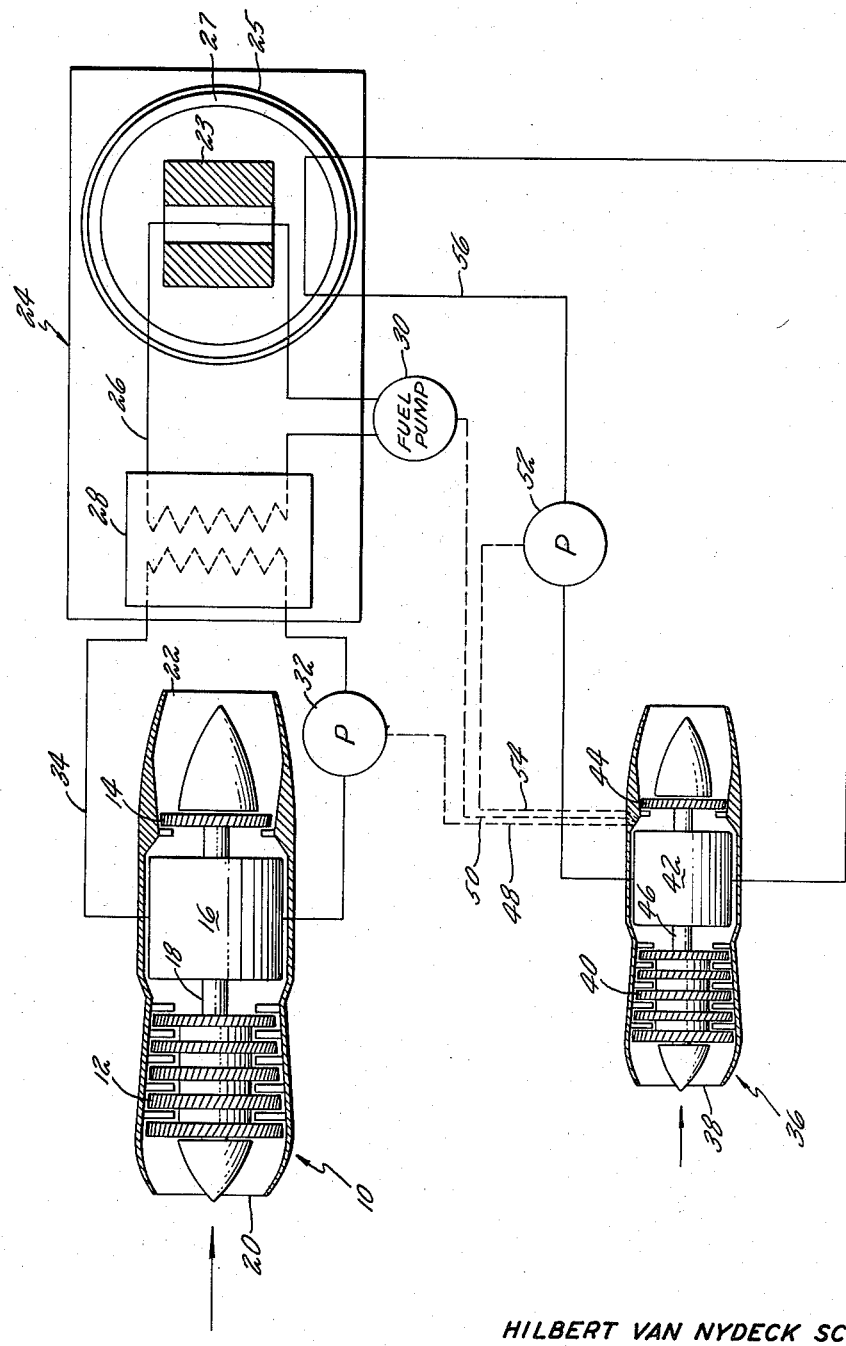
INVENTOR
HILBERT VAN NYDECK SCHENCK JR.
BY M. B. Tasker
ATTORNEY

United States Patent Office 3,102,852
Patented Sept. 3, 1963

3,102,852
NUCLEAR POWER PLANT
Hilbert V. Schenck, Jr., Potsdam, N.Y., assignor, by mesne assignments, to the United States of America as represented by the United States Atomic Energy Commission
Filed May 7, 1957, Ser. No. 657,667
7 Claims. (Cl. 204—193.2)

This invention relates to nuclear powered turbojet engines and has as one of its objects to utilize the heat formerly wasted in the reactor due to energy deposited by nuclear radiation heating.

In a nuclear powered turbojet engine a considerable amount of power is required to pump the reactor fuel through the reactor chamber and the intermediate heat exchanger and to pump the heat exchange medium, usually liquid metal, through the heat exchanger and the radiator of the engine. This power has heretofore been taken from the engine, usually by utilizing compressed air bled from the compressor to drive air driven pumps or by taking power directly from the engine shaft to drive the pumps.

In accordance with this invention, this auxiliary power is supplied by a small turbojet engine having its own compressor-turbine unit and radiator through which a heat exchange medium is circulated to heat the air discharged from the compressor into the turbine. This heat exchange medium for the auxiliary engine obtains its heat from the coolant which is circulated through the reactor chamber to remove the energy deposited therein by nuclear radiation. The pump for circulating the coolant through the reactor and the radiator of the auxiliary engine is also driven by the auxiliary engine.

It is, therefore, a primary object of this invention to provide the power for these auxiliaries of the main engine and the auxiliary engine from the auxiliary engine and to power the latter by the heat absorbed by the coolant circulated through the heated parts of the reactor.

A further object of the invention is to avoid the necessity for taking air or work from the main engine for the operation of engine accessories.

Another object of the invention is to utilize the heat from the reactor shield and/or moderator which would otherwise be wasted.

These and other objects and advantages of the invention will be pointed out specifically in the following description of one embodiment of the invention shown in the accompanying drawing. This drawing shows somewhat schematically main and auxiliary turbojet engines associated with a circulating-fuel reactor in accordance with this invention.

Referring to the drawing, 10 indicates generally a main turbojet engine, including a compressor 12, a turbine 14, and a radiator 16. The compressor and turbine are connected in the usual manner by a shaft 18, so that the compressor is driven by the turbine in the customary way to compress air entering at the inlet 20 and discharge it through the radiator and through the turbine into the discharge nozzle 22.

Heat for the radiator 16 is obtained from a reactor 24. Heat is generated in the reactor by circulating fuel in a circuit 26 through the moderator 23 in the reactor chamber 25. Heat is also generated in the reactor shield 27. Also included in the circuit 26 is an intermediate heat exchanger 28. The fuel in circuit 26 is circulated by a fuel pump 30 which may be an air turbine driven pump. Liquid metal, or some other suitable heat exchange medium, is also circulated by a pump 32 through a second circuit 34 which passes through the intermediate heat exchanger 28 and the radiator 16 of engine 10. It will be understood that the radiator 16 is used in place of the usual combustion chambers in which fuel is burned to heat the air from the compressor 12 before it enters turbine 14.

In accordance with the present invention the power to drive pumps 30 and 32 is obtained from an auxiliary turbine generally indicated at 36. This engine has the usual air intake 38 through which air is introduced to the compressor 40, wherein it is compressed and discharged through the radiator 42 into turbine 44. The turbine 44 is connected through shaft 46 with the compressor 40 and drives the latter in a usual manner. Compressed air is bled from engine 36 through a conduit 48 to drive air turbine pump 32. Similarly, compressed air is bled from the engine 36 through conduit 50 to drive the air turbine fuel pump 30. An air turbine pump 52 is likewise driven by air bled from compressor 40 through a conduit 54 for circulating the heating medium which circulates in circuit 56 through radiator 42 where air from compressor 40 is heated prior to its discharge into turbine 44. Preferably, conduits 48, 50 and 54 are connected to engine 36 downstream of radiator 42 so as to take advantage of the increased energy in the heated air.

The heat exchange medium in circuit 56, which may be liquid metal, receives its heat from the reactor cooling means which is included in this circuit. Thus, the heat exchange medium in circuit 56 may pass through the reactor where it cools both the moderator and the heat shield to remove the energy deposited by nuclear radiation. Preferably, both of these sources of waste heat are utilized. The heat generated in the moderator may be in a typical reactor about 5% of the heat generated in the reactor system. The heat generated in the shield and reflector may be roughly 5% of the total heat produced. Utilization of the heat from both the moderator and the shield in the cooling circuit 56 will provide ample power in engine 36 to take care of the auxiliary services for both engine 10 and engine 36 without taking any work from the main engine 10.

It will thus be evident that by this invention means has been provided for utilizing otherwise waste heat in the reactor cooling circuit thus saving a considerable amount of power which otherwise would have to be taken from the main engine turbine 10.

While I have described a preferred embodiment which my invention may assume in practice, it will be evident that various changes may be made in the construction and arrangements of the parts without exceeding the scope of the invention.

I claim:

1. In a nuclear power plant, a turbojet engine having a gas turbine, an air compressor driven by said turbine and a radiator for heating the air discharged from the compressor into the turbine, a circulating-fuel reactor, a heat exchanger, means including a pump for circulating fuel through said reactor and through said heat exchanger, means including a pump for circulating a heat transfer medium through said heat exchanger and through said radiator, an auxiliary turbojet engine having a gas turbine, an air compressor driven by said turbine and a radiator for heating air discharged from the compressor into said turbine, means for cooling of reactor parts to remove the energy deposited by nuclear radiation heating including a pump for circulating a heat transfer medium through the reactor and through the radiator of said auxiliary engine, and means for driving said pumps associated with said main and auxiliary engines from said auxiliary engine.

2. In a nuclear power plant, a turbojet engine having a gas turbine, an air compressor driven by said turbine and a radiator for heating the air discharged from the compressor into the turbine, a circulating-fuel reactor having a moderator, a heat exchanger, means including a pump for circulating fuel through said reactor and through said heat exchanger, means including a pump for circulating a heat transfer medium through said heat exchanger and through said radiator, an auxiliary turbojet engine having a gas turbine, an air compressor driven by said turbine and a radiator for heating air discharged from the compressor into said turbine, means including a pump for circulating a heat transfer medium through the moderator of said reactor and through the radiator of said auxiliary engine, and means for driving said pumps associated with said main and auxiliary engines from said auxiliary engine.

3. In a nuclear power plant, a turbojet engine having a gas turbine, an air compressor driven by said turbine and a radiator for heating the air discharged from the compressor into the turbine, a circulating-fuel reactor having a shield, a heat exchanger, means including a pump for circulating fuel through said reactor and through said heat exchanger, means including a pump for circulating a heat transfer medium through said heat exchanger and through said radiator, an auxiliary turbojet engine having a gas turbine, an air compressor driven by said turbine and a radiator for heating air discharged from said compressor into said turbine, means including a pump for circulating a heat transfer medium through the shield of said reactor to cool the latter and through the radiator of said auxiliary engine to heat the air passing therethrough, and means for driving said pumps from said auxiliary engine.

4. In a nuclear power plant, a turbojet engine having a gas turbine, an air compressor driven by said turbine and a radiator for heating the air discharged from the compressor into the turbine, a circulating-fuel reactor having a shield and a moderator, an intermediate heat exchanger, means including a pump for circulating fuel through said reactor and said heat exchanger, means including a pump for circulating a heat exchange medium through said radiator and said heat exchanger, an auxiliary turbojet engine having a gas turbine, an air compressor driven by said turbine and a radiator for heating the air discharged from the compressor into said turbine, means including a pump for circulating a heat exchange medium through said reactor and through the radiator of said auxiliary engine, and means for driving said pumps associated with said main and auxiliary engines from said auxiliary engine.

5. In a nuclear power plant, a turbojet engine having a gas turbine, an air compressor driven by said turbine and a radiator for heating the air discharged from the compressor into the turbine, a circulating-fuel reactor having a shield and a moderator, an intermediate heat exchanger between said reactor and said engine, means including an air driven pump for circulating fuel through said reactor and through said heat exchanger, means including a second air driven pump for circulating a heat transfer medium through said heat exchanger and through said radiator, an auxiliary turbojet engine having a gas turbine, an air compressor driven by said turbine and a radiator for heating the air discharged from the compressor into said turbine, means including an air driven pump for circulating a heat transfer medium through said reactor to cool said shield and said moderator and through the radiator of said auxiliary engine to heat the air passing therethrough, and means for driving said pumps by compressed air bled off from said auxiliary engine compressor.

6. In combination, a main turbojet engine, an auxiliary turbojet engine having a compressor and a turbine driven by said compressor into which said compressor discharges, a nuclear reactor, means including pump means for transferring heat from said reactor to said main engine, said pump means being driven by said auxiliary engine, said reactor having a shield and a moderator, a coolant circuit through said reactor for cooling said shield and moderator, a radiator in said auxiliary engine between the compressor and the turbine thereof through which said coolant circulates for transferring heat to the air discharged from said compressor into said turbine, and a pump in said coolant circuit driven by said auxiliary engine for circulating said coolant.

7. In combination, a main turbojet engine including a turbine, a compressor driven by said turbine and a radiator for transferring heat to the air discharged from said compressor into said turbine, an auxiliary turbojet engine including a turbine, a compressor driven by said turbine and a radiator for transferring heat to the air discharged from said compressor into said turbine, a nuclear reactor having a shield and a moderator, means for transferring heat from said reactor to the radiator of said main engine including pump means for circulating heat transfer medium, means for transferring heat from said reactor shield and moderator to the radiator of said auxiliary engine including pump means for circulating a heat transfer medium, and means for driving the pump means associated with said main and auxiliary engines from said auxiliary engine.

References Cited in the file of this patent

UNITED STATES PATENTS

| | | |
|---|---|---|
| 2,531,761 | Zucrow | Nov. 28, 1950 |
| 2,776,537 | Peterson | Jan. 8, 1957 |

FOREIGN PATENTS

| | | |
|---|---|---|
| 739,314 | Great Britain | Oct. 26, 1955 |

OTHER REFERENCES

Principles of Jet Propulsion and Gas Turbines, by M. J. Zucrow, John Wiley & Sons, New York, 1948, pp. 259 to 261.

American Aviation, vol. 14, No. 4, July 15, 1950, pp. 11, 12 and 15.

Popular Science, October 1951, pp. 98–102.

Raymond L. Murray, Prentice Hall, New York, 1954, pp. 351–358, 359, 360.

ORNL–1845(Del.), U.S. Atomic Energy Commission Technical Information Service, Sept. 6, 1955, pp. 1, 2, 4–10, 70, 71, 120, 121, 122.

Nucleonics, March 1956. pp. 34–44.

Nucleonics, June 1957, pp. 20, 21.